F. P. SOUDER.
CANDY PULLING MACHINE.
APPLICATION FILED MAR. 24, 1911. RENEWED JUNE 7, 1912.

1,032,958.

Patented July 16, 1912.

5 SHEETS—SHEET 1.

F. P. SOUDER.
CANDY PULLING MACHINE.
APPLICATION FILED MAR. 24, 1911. RENEWED JUNE 7, 1912.

1,032,958.

Patented July 16, 1912.

5 SHEETS—SHEET 3.

Witnesses:—

Inventor:—
Frank P. Souder.
by his Attorneys.—
Howson & Howson

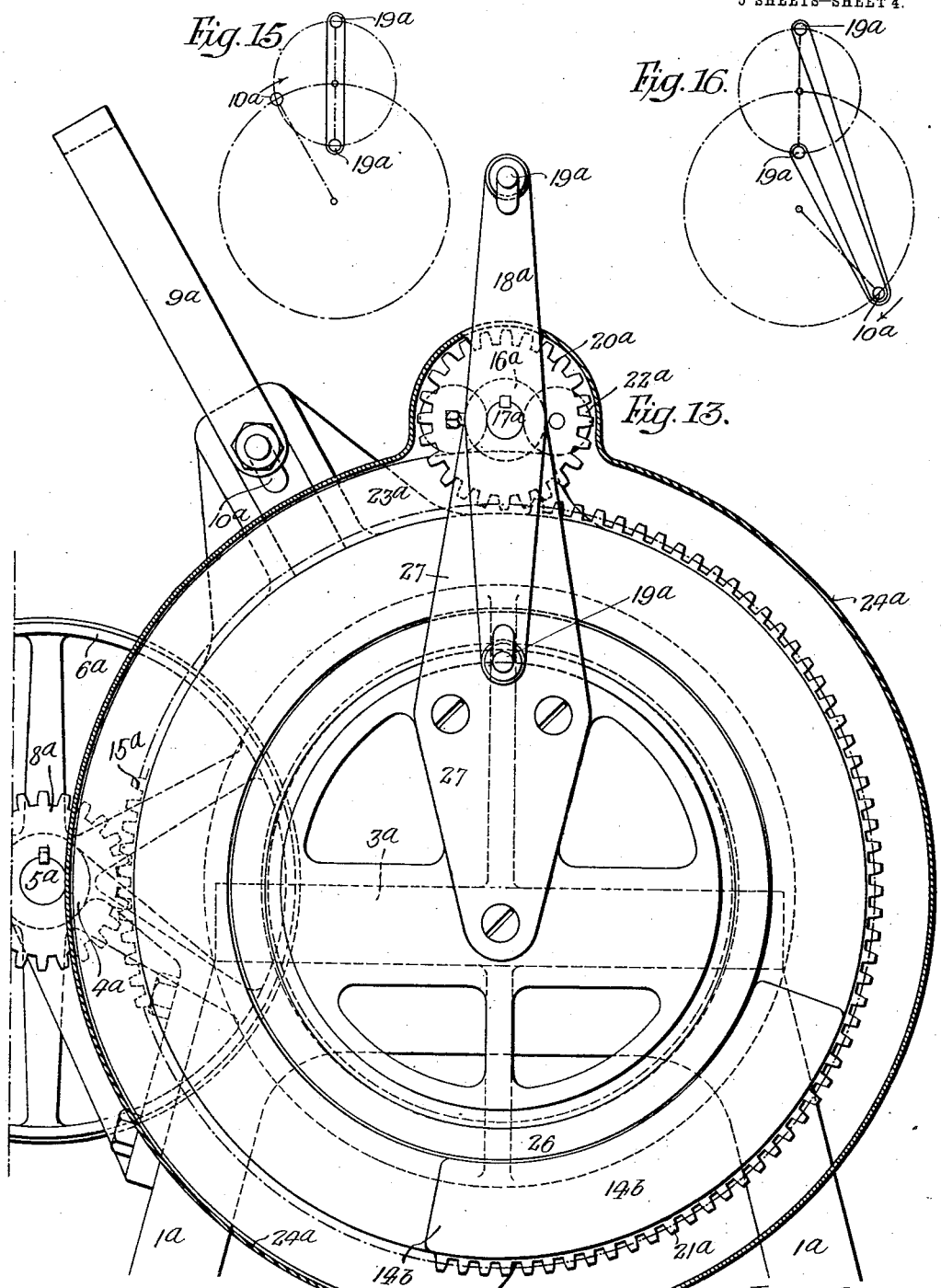

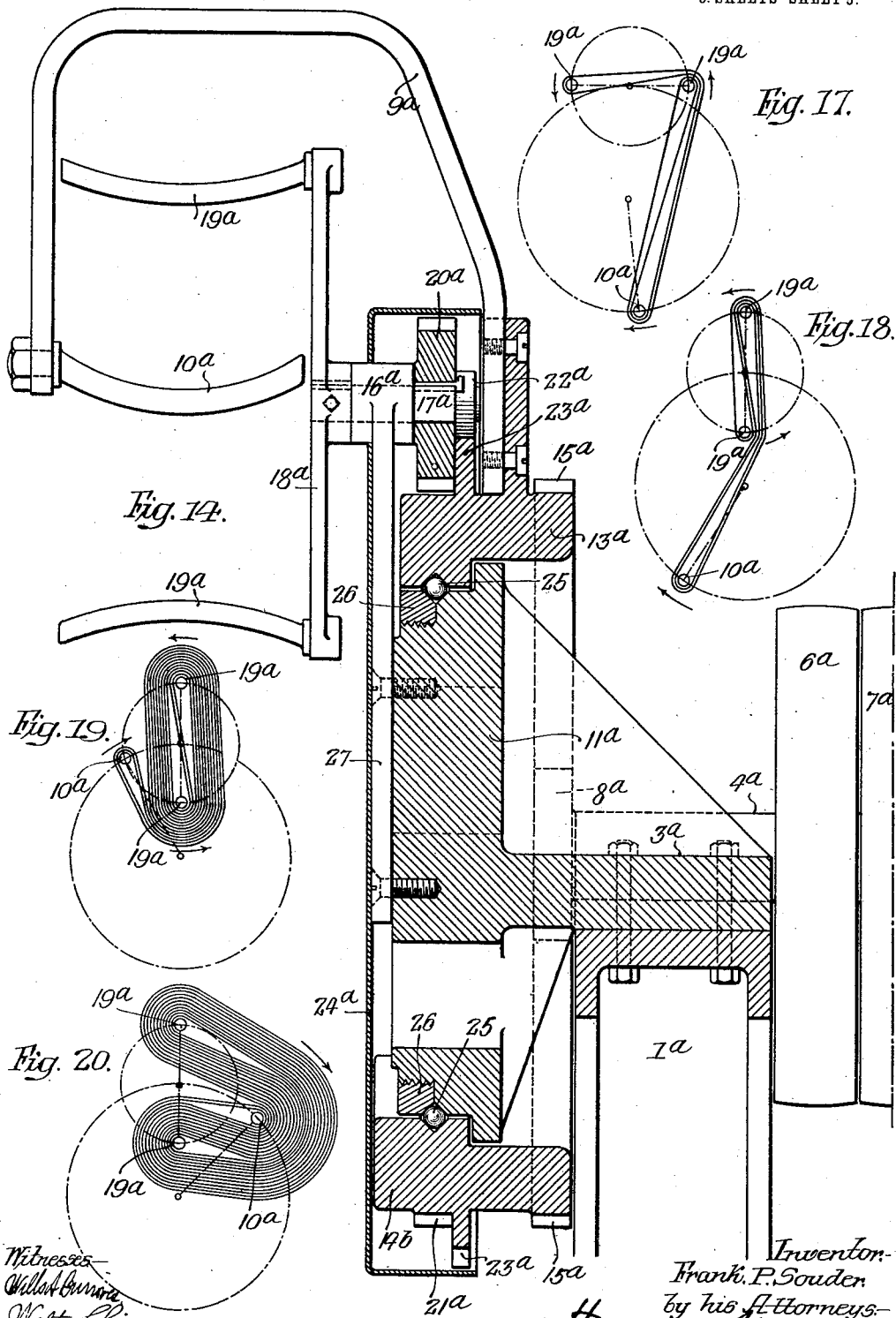

UNITED STATES PATENT OFFICE.

FRANK P. SOUDER, OF BRIDGETON, NEW JERSEY, ASSIGNOR OF ONE-HALF TO FRANK H. GIBSON, OF BRIDGETON, NEW JERSEY.

CANDY-PULLING MACHINE.

1,032,958.   Specification of Letters Patent.   Patented July 16, 1912.

Application filed March 24, 1911, Serial No. 616,566. Renewed June 7, 1912. Serial No. 702,362.

*To all whom it may concern:*

Be it known that I, FRANK P. SOUDER, a citizen of the United States, and a resident of Bridgeton, Cumberland county, New Jersey, have invented certain Improvements in Candy-Pulling Machines, of which the following is a specification.

My invention relates to mechanism designed to pull and aerate candy. The object and purpose of such action is too well known to require detailed description herein.

My invention comprises a machine of novel construction by the use of which I am enabled to effect a large amount of work upon the candy in a short space of time.

Figure 1:
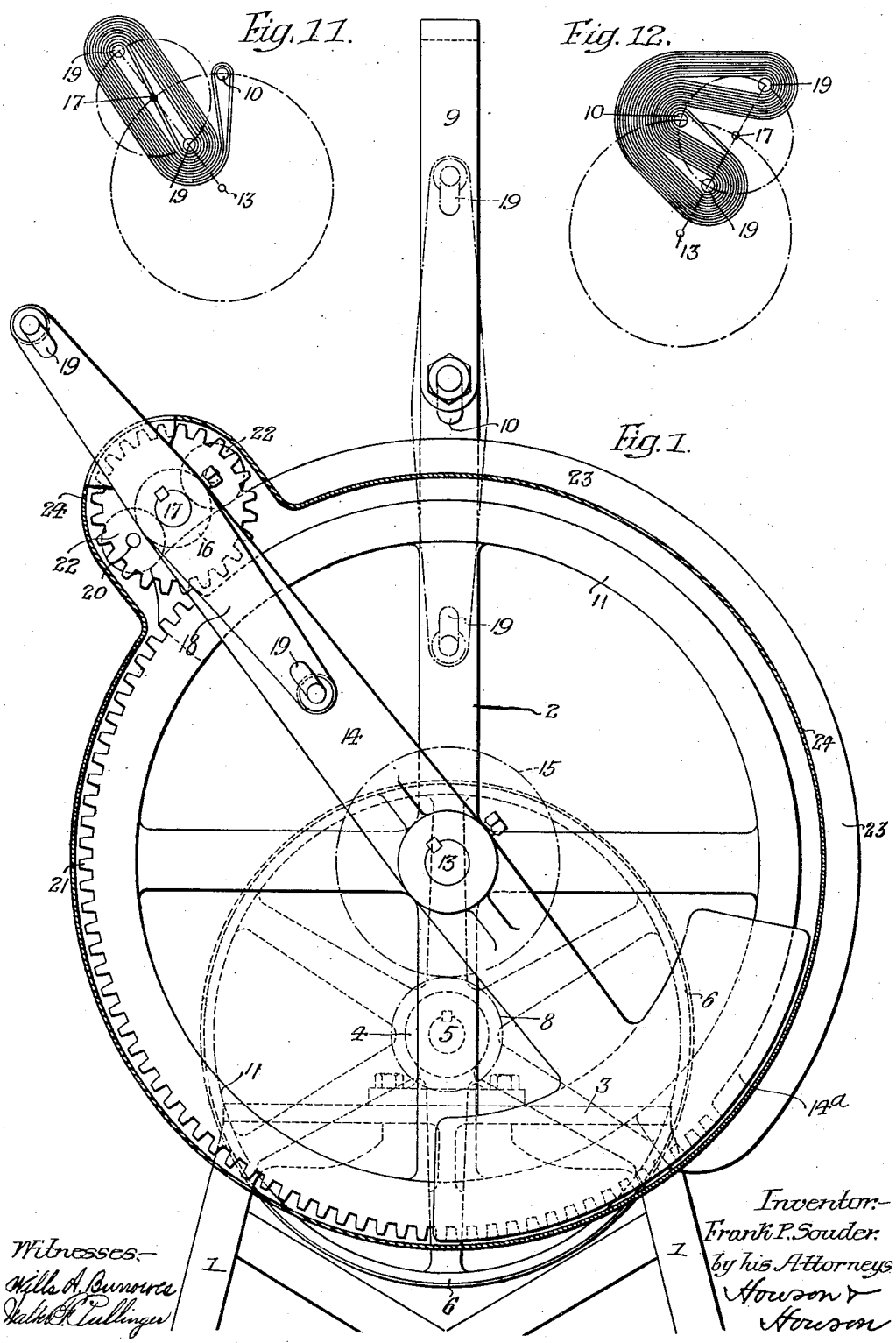
Figure 2:
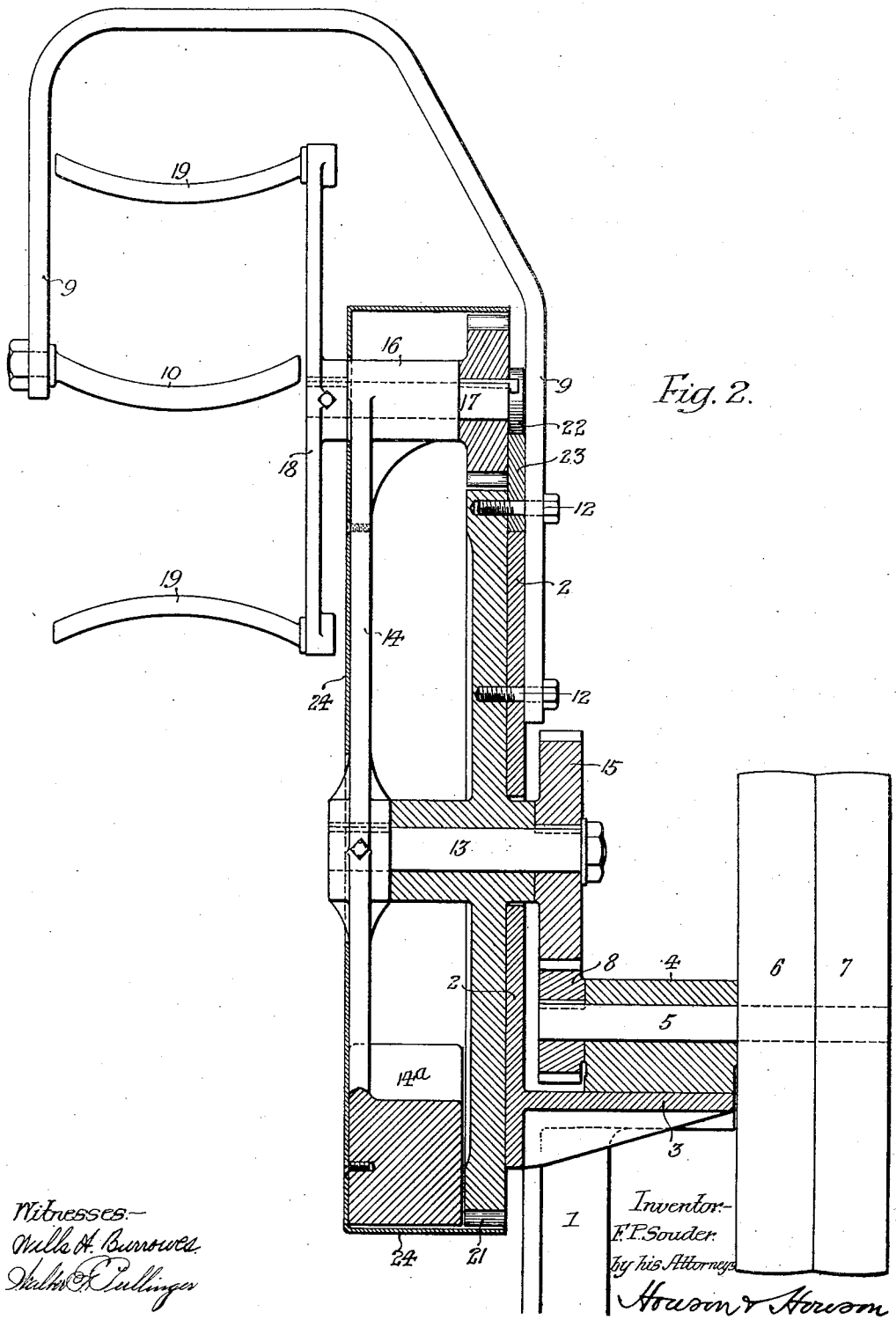

The several features of my invention and the structure in which they are embodied are more fully pointed out hereinafter, reference being had to the accompanying drawings, in which:

Figure 1, is a front elevation of one form of candy pulling machine embodying my invention; Fig. 2, is a side elevation of the same, partly in section on the line $a$—$a$, Fig. 1; Figs. 3 to 12, inclusive, are diagrammatic views illustrating the operation of pulling candy by the use of the machine shown in Figs. 1 and 2; Fig. 13, is a front elevation of a modified form of candy pulling machine embodying my invention; Fig. 14, is a side elevation of the same, partly in section on the line $b$—$b$, Fig. 13, and Figs. 15 to 20, inclusive, are diagrammatic views illustrating the operation of pulling candy by the use of the machine shown in Figs. 13 and 14.

The machine forming the subject of my invention as shown in Figs. 1 and 2 comprises a suitable supporting frame partly indicated at 1, carrying an upwardly extending bracket 2, with a table or platform 3. Such table or platform 3 may carry a suitable bearing 4 in which is journaled a shaft 5 having fast and loose pulleys 6 and 7 at one end, and a pinion 8 at the opposite end. Secured to the bracket 2 is an upwardly extending and curved arm 9 which carries a fixed pin or rod 10, forming one of the pulling elements. The said bracket also supports a ring or flange 11; the latter being held thereto by suitable means, such as bolts or studs 12, and centrally mounted with respect to this ring is a stub shaft 13 to which an arm 14 may be keyed, while on the opposite end of said shaft a gear 15 is mounted meshing with the pinion 8 on the shaft 5 and driven therefrom, whereby movement may be imparted to said arm 14. One end of the arm 14 carries a bearing 16 for a short shaft 17, while the opposite end is provided with a counterbalance 14$^a$. One end of the shaft 17 carries a double arm 18 to the ends of which are secured pins 19; the whole forming a reel and comprising the other pulling element and being disposed for movement with respect to the pin 10 carried by the curved arm 9. The opposite end of the shaft 17 carries a pinion 20 for engagement with a rack 21 on the ring 11, so that when movement is imparted to said arm 14, it will carry the reel around said ring 11, and when the pinion 20 reaches the rack 21, the said reel will be rotated on the shaft 17. To prevent movement of said reel during the time it is merely swung around the shaft 13 as an axis, I provide rollers 22 carried by the pinion 20, which rollers are adapted to ride on a rail 23 carried by said ring 11; thereby maintaining the reel in a radial position with respect to the ring 11. By preference, to keep the candy entirely clear of the operating mechanism, the arm 14, ring 11, and other parts are inclosed by a housing 24, as clearly shown in Fig. 2; such housing being carried by the arm 14.

Figure 3:
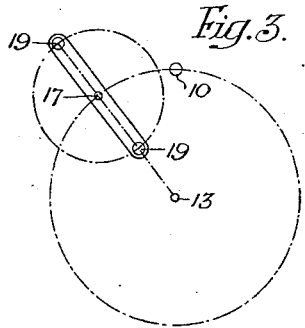
Figure 4:
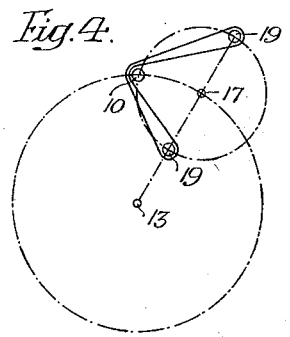
Figure 5:
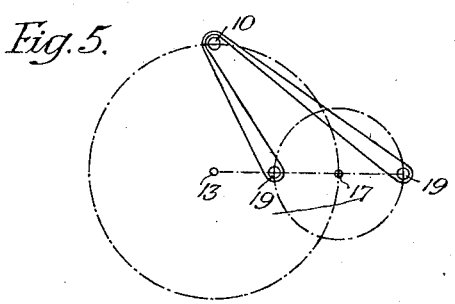
Figure 6:
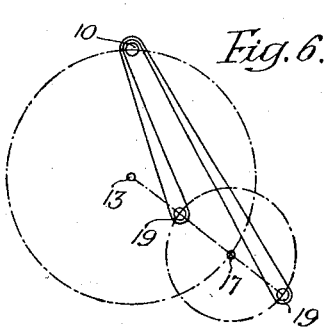
Figure 7:
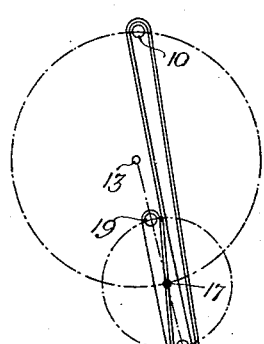
Figure 8:
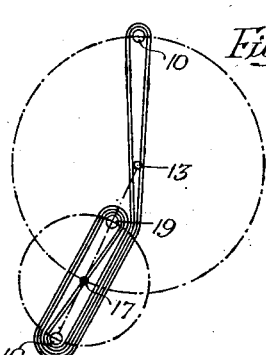
Figure 9:
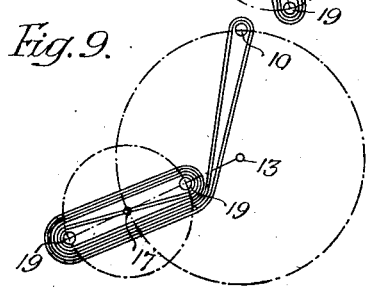
Figure 10:
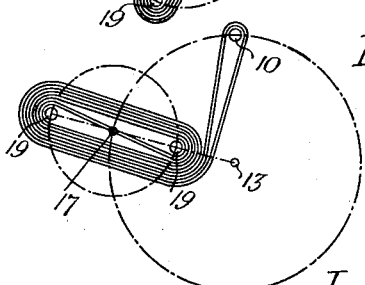

The operation of pulling the candy can be readily understood by reference to the diagrammatic views, Figs. 3 to 12, inclusive. In Fig. 3, the single lines surrounding the pins 19 of the reel are intended to represent the loop of candy. In Fig. 4, the pins 19 have been swept past the pin 10 which has caught the candy, and on the continued movement of said pins 19, as indicated by Figs. 5 and 6, considerable stretch is imparted to the candy. In Fig. 7, the pins 19 of the reel have been given a half revolution on their axis or shaft 17, and are commencing to wrap the candy about the same, and the reel may continue to rotate about such axis until several turns have been given the candy; the successive wrappings being indicated in Figs. 8, 9, 10 and 11. In Fig. 11, the reel carrying the pins 19 has stopped its rotative movement about the axis 17 and is in the same position as that indicated in Fig. 3. It will be seen therefore that when the reel reaches this part of its movement that the candy has been considerably stretched and wrapped around the pins 19 and in this condition it keeps on for further stretching and wrapping; the position shown in Fig. 12 corresponding to that shown in Fig. 4.

While the movement of rotation imparted to the reel may vary, it must never be less than a half revolution, since it must be disposed for movement of translation past the pin 10 with the arm 18 in a vertical (radial) position and the pins 19 directly above each other. This movement of rotation of the reel may be anything from a half revolution up to two or more full revolutions, depending upon the gearing; that is to say, the length of the rack 21 carried by the ring 11 and the size of the pinion 20 engaging the same. Preferably, however, the movement imparted to the reel is not a full revolution or a plurality of full revolutions, as it is desirable to shift the position of the loop of candy and present it for movement past the pin 10 with the pins 19 of the reel reversed for their alternate movements.

By the use of my improved machine, I impart alternate stretching and wrapping operations to the candy, effecting in a small space and in a short amount of time a high degree of pull and aeration.

While I have shown in Figs. 1 and 2 of the drawings a single pin as the fixed pulling element, with a revoluble reel carrying a pair of pins, which reel is rotatable about the fixed pin and forms the other pulling element, it will be understood that these conditions might be reversed; that is to say, the reel might be carried by a fixed axis upon which it revolves intermittently, and the single pin could be given a movement of rotation with respect to the pins of the reel and effect substantially the same action upon the candy. Such construction I have shown in Figs. 13 and 14, in which 1ª represents a suitable supporting frame carrying a table or platform 3ª, having a circular boss or projection 11ª. Such table or platform may carry a suitable bearing 4ª in which may be journaled a shaft 5ª, having fast and loose pulleys 6ª and 7ª at one end, and a pinion 8ª at the opposite end. Journaled upon the boss or projection 11ª, is a rotatable hub 13ª, carrying a curved arm 9ª having a pin or rod 10ª, forming one of the pulling elements; said members 11ª and 13ª being properly grooved to provide race ways for a series of anti-friction balls 25, and the boss or projection 11ª having a screw ring 26 retaining said balls in position. The hub 13ª is provided with an annular rack 15ª meshing with the pinion 8ª on the shaft 5ª and driven therefrom, whereby movement may be imparted to said arm 9ª and the pulling element 10ª carried thereby. The opposite side of the hub 13ª may be provided with a counterbalance portion 14ᵇ, integral therewith. Secured to the boss or projection 11ª, is an arm 27 having a bearing 16ª for a short shaft 17ª. One end of this shaft 17ª carries a double arm 18ª to the ends of which are secured pins 19ª; the whole forming a reel and comprising the other pulling element and being disposed for rotative movement only on said shaft 17ª, while the pin 10ª carried by the curved arm 9ª rotates in a circular plane cutting the axis of said reel. The opposite end of the shaft 17ª carries a pinion 20ª for engagement with a rack 21ª on the hub 13ª, so that when movement is imparted to said hub, the reel will be rotated on its shaft 17ª when the pinion 20ª reaches the rack 21ª. To prevent movement of said reel during the time its pinion is disengaged from the rack 21ª I provide rollers 22ª carried by said pinion 20ª, which rollers are adapted to ride on a rail 23ª carried by said hub 13ª; thereby maintaining the reel substantially fixed with its arms in a radial position with respect to the axis of rotation of the hub.

The operation of pulling the candy by the use of the machine shown in Figs. 13 and 14, is, as may be readily understood upon reference to Figs. 15 to 20, inclusive, substantially the same as that illustrated in Figs. 3 to 12, inclusive; the relative positions of the pulling elements being merely reversed. As in the use of that structure, while the movement of rotation imparted to the reel may vary, it must never be less than a half revolution since it must be disposed for the movement of the pin 10ª past the same with the arm 18ª in a vertical (radial) position, and with the pins 19ª directly above each other. The movement of the reel is determined by the length of the rack 21ª carried by the hub 13ª and the size of the pinion 20ª engaging said rack.

I claim:

1. In a candy pulling machine, the combination of a single pin forming one pulling element, a pair of pins rotatably mounted forming a second pulling element, means for moving one of said pulling elements past the other, and means for intermittently rotating said pair of pins.

2. In a candy pulling machine, the combination of a pulling element comprising a fixed pin, a second pulling element comprising a pair of pins, means for rotating said second pulling element with respect to the first, and means for intermittently revolving said pins of the second pulling element during its rotative movement with respect to the first pulling element.

3. In a candy pulling machine, the combination of a pulling element comprising a single pin, a second pulling element comprising a pair of pins rotatably mounted, means for moving one of said pulling elements past the other, and means for intermittently rotating said pair of pins before and after the movement of translation.

4. In a candy pulling machine, the combination of a pulling element comprising a fixed pin, a second pulling element comprising a pair of pins rotatably mounted, means for moving said second pulling element past the first, and means for intermittently rotating said pair of pins before and after the movement of translation past the first pulling element.

5. The combination, in a candy pulling machine, of a fixed pin, a pair of pins rotatably mounted and bodily movable in the arc of a circle past said fixed pin, means for effecting such movement of the pair of pins, and means for intermittently rotating said pins on their axis simultaneously with their movement of translation.

6. The combination, in a candy pulling machine, of a fixed pin, a pair of pins rotatably mounted and bodily movable in the arc of a circle past said fixed pin, means for effecting such movement of the pair of pins, and means for intermittently rotating said pins on their axis in combination with their movement of translation.

7. The combination, in a candy pulling machine, of a fixed pin, a pair of pins rotatably mounted, an arm carrying said pins, means for moving said arm whereby the pair of pins may be bodily moved in the arc of a circle past said fixed pin, and means for intermittently rotating said pins on their axis simultaneously with their movement of translation.

8. In a candy pulling machine, the combination of a fixed pin, a pair of pins bodily movable about a common center in a path including said fixed pin, said pair of pins being rotatable about a second and independent axis, and means for intermittently rotating said pins.

9. In a candy pulling machine, the combination of a fixed pin, a pair of pins bodily movable about a common center in a path including said fixed pin, said pair of pins being rotatable about a second and independent axis, and means for intermittently rotating said pins.

10. In a candy pulling machine, the combination of a fixed pin, a pair of pins, an arm carrying the latter and bodily movable about a common center whereby said pair of pins may be moved in a path including said fixed pin, said pair of pins being rotatable about a second and independent axis, and means for intermittently rotating said pair of pins.

11. In a candy pulling machine, the combination of a fixed pin, a pair of pins, an arm carrying the latter and bodily movable about a common center whereby said pair of pins may be moved in a path including said fixed pin, said pair of pins being rotatable about a second and independent axis, a pinion carried by the axis of said pair of pins, and a segmental rack for engagement with said pinion whereby said pair of pins may be rotated on their axis during their movement of translation.

12. In a candy pulling machine, the combination of a frame carrying a fixed pin, an arm rotatably mounted with respect to said frame, a member carrying a pair of pins journaled at one end of said arm, means for swinging said arm with the pair of pins carried thereby radially disposed with respect to its axis so as to pass the fixed pin, and means for rotating said pair of pins on their own axis while being swung by the movable arm.

13. In a candy pulling machine, the combination of a frame carrying a fixed pin, an arm rotatably mounted with respect to said frame, a member carrying a pair of pins journaled at one end of said arm, a counterbalance at the opposite end of said arm, means for swinging said arm with the pair of pins carried thereby radially disposed with respect to its axis so as to pass the fixed pin, and means for intermittently rotating said pair of pins on their own axis while being swung by the movable arm.

14. In a candy pulling machine, the combination of a frame carrying a fixed pin, a segmental rack carried by said frame, an arm rotatably mounted, a member carrying a pair of pins journaled at one end of said arm, means for swinging said arm in the arc of a circle with the pair of pins carried thereby radially disposed with respect to its axis so as to pass the fixed pin, and a pinion carried by the member supporting the pair of pins for engagement with the rack whereby said pair of pins may rotate on their own axis while being swung by the movable arm.

15. In a candy pulling machine, the combination of a frame carrying a fixed pin, a segmental rack carried by said frame, an arm rotatably mounted with respect to the frame, a member carrying a pair of pins journaled at one end of said arm, means for swinging said arm in the arc of a circle with the pair of pins carried thereby radially disposed with respect to its axis so as to pass the fixed pin, and a pinion carried by the member supporting the pair of pins for engagement with the rack whereby said pair of pins may be rotated on their own axis for a part of their movement by the rotatable arm.

16. The combination, in a candy pulling machine, of a fixed pin, a pair of pins rotatably mounted, an arm carrying said pins, means for moving said arm whereby the pair of pins may be bodily moved in the arc of a circle past said fixed pin, a segmental rack, a pinion for engagement with said rack, said pinion being carried at the axis of said pins whereby they may be rotated simultaneously with their movement of translation, and a housing for inclosing the means for operating the rotatable pins.

In testimony whereof, I have signed my name to this specification, in the presence of two subscribing witnesses.

FRANK P. SOUDER.

Witnesses:
CHAS. A. SOCKWELL,
FRANK LOVE.